United States Patent [19]

Morrison et al.

[11] 4,440,557
[45] Apr. 3, 1984

[54] METHOD AND APPARATUS FOR FORMING AND COLLECTING CONTINUOUS GLASS FILAMENTS

[75] Inventors: Michael W. Morrison, Newark; Clarence E. Fracker, Jr., Frazeysburg; Jerome F. Marra, Heath, all of Ohio

[73] Assignee: Owens-Corning Fiberglas Corporation, Toledo, Ohio

[21] Appl. No.: 450,941

[22] Filed: Dec. 20, 1982

[51] Int. Cl.³ .............................................. C03B 37/12
[52] U.S. Cl. ........................................... 65/3.1; 65/2; 65/10.1; 65/11.1; 34/24; 34/224
[58] Field of Search .................. 65/2, 3.1, 10.1, 11.1; 34/16, 18, 24, 224

[56] References Cited

U.S. PATENT DOCUMENTS

| | | | |
|---|---|---|---|
| 2,804,693 | 9/1957 | Brode | 34/18 |
| 3,340,617 | 9/1967 | Carroll | 34/18 |
| 3,851,453 | 12/1974 | Roberson | 65/2 X |
| 4,088,468 | 5/1978 | Roberson | 65/3.1 |
| 4,218,830 | 8/1980 | Grassmann | 34/1 |

Primary Examiner—Robert L. Lindsay, Jr.
Attorney, Agent, or Firm—Ronald C. Hudgens; Philip R. Cloutier; Greg Dziegielewski

[57] ABSTRACT

The present invention encompasses a system for at least partially drying or curing wet glass strand as it is being wound into a package wherein streams of heated gas, such as air, are directed into contact with the outer layer of strand being collected on a rotating collet. Preferably, the streams of gas have a specific orientation with respect to the layers of strand and are supplied at predetermined temperatures and velocities to maximize the drying effect.

24 Claims, 6 Drawing Figures

TO DISTRIBUTION MEANS

TO EXHAUST ZONE

METHOD AND APPARATUS FOR FORMING AND COLLECTING CONTINUOUS GLASS FILAMENTS

TECHNICAL FIELD

The invention disclosed herein relates to method and apparatus for forming and collecting continuous glass filaments wherein a winder is equipped with a distribution means for supplying streams of gas according to specific parameters, such as velocity and orientation with respect to the package surface to at least partially dry the strand being collected.

BACKGROUND ART

In the production of continuous glass filaments, the newly drawn filaments are coated with a liquid sizing, usually aqueous based, to coat and protect the individual filaments. Historically, strands of such filaments are helically wound into packages in a wet condition. The packages of strand are subsequently dried or cured in an oven to remove a suitable amount of the solvent or moisture from the sizing material. In addition to being expensive to operate, the use of such ovens to dry a complete package can degrade the filaments/strand in certain zones in the package.

Attempts have been made to dry the strand prior to being collected on the winder to assist in drying the package prior to heating the package in the aforementioned ovens, or even to obviate the need for the ovens. Such attempts have included the use of high frequency dielectric heating systems for drying the strand. The present invention provides a relatively simple, effective system for drying the advancing strand as it is being wound into a package.

DISCLOSURE OF THE INVENTION

The present invention encompasses a system for at least partially drying or curing coated glass strand wherein streams of heated gas, such as air, are directed into contact with the outer layer of strand being collected on the rotating collet. Preferably, the streams of gas are supplied in a specific orientation with respect to the layers of strand and at predetermined temperatures and velocities to maximize the drying effect.

BEST MODE OF CARRYING OUT THE INVENTION

Figure 1:
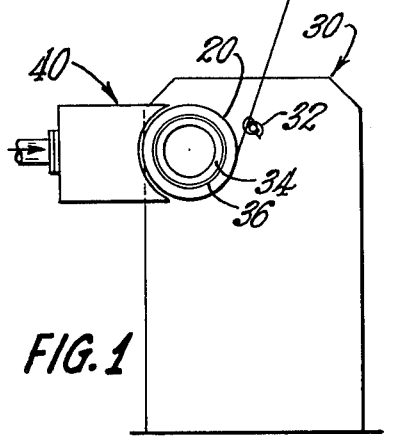
FIG. 1 is a semischematic front elevational view of a glass fiber forming system according to the principals of this invention.

As shown in FIG. 1, feeder 10 supplies a plurality of streams of molten inorganic material, such as glass, which are drawn into filaments 12 through the action of winder 30. Size or coating applicator means 14 is adapted to apply a liquid coating or sizing to the advancing filaments 12. Such sizings are usually aqueous based, but they may be of any suitable type. Subsequently, filaments 12 are gathered into a strand 18 at gathering means or shoe 16.

Strand 18 is then wound into package 20 on a driven, rotatable member or collet 34 of winder 30. As is known in the art, a sleeve or tube 36 may be provided on collet 34 upon which to wind strand 18. Winder 30 also includes a traversing mechanism or spiral wire 32 to distribute the strand along the length of the package collection region of collet 34 to deposit the strand in helically wound layers.

Figure 2:
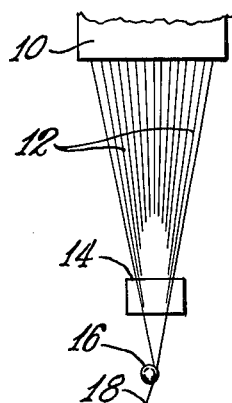
FIG. 2 is an enlarged view of the distribution system shown in FIG. 1.
Figure 2:
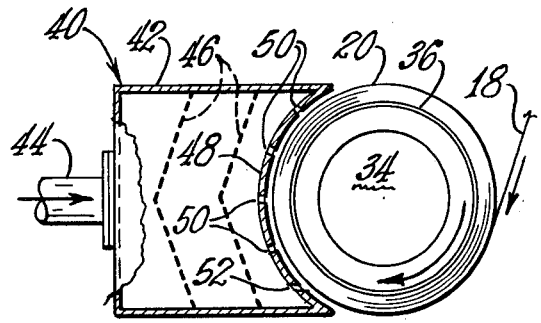

As shown in FIGS. 1 and 2, distribution means 40 supplies or directs a moving body of gas to at least partially dry or cure the coated filaments or strand being wound around member 34. Distribution means 40, which may be movable with respect to the axis of rotation of collet 34, is comprised of housing 42 having a foraminous surface 48 to direct a plurality of streams of gas at the package collection region of collet 34. Foraminous surface 48 may be of any suitable shape, but an arcuate shape generally conforming to the circular package being formed is preferred.

Housing 42 has an inlet 44 which is in communication with a suitable supply of pressurized gas, preferably heated air. Within housing 42, baffles 46 are positioned to disperse the heated air to provide a substantially uniform distribution of the working fluid or air at foraminous surface 48.

Foraminous surface 48 includes a first orificed section adapted to direct a moving body of the gas inwardly towards the layers of strand wound around member 34 along the length of such layers. Conveniently, the first orificed section may be comprised of a plurality of spaced apart orifices 50. Such orifices 50 may be arranged in a plurality of rows extending along the length of the package collection region. Optionally, the body of gas may be delivered from a single lengthwise slot or a plurality of such slots or any other suitable arrangement.

Foraminous surface 48 also includes a second orificed section adapted to direct a planar flow of said gas into severely oblique contact with the outer layer of strand wound around member 34 along the length of the layer. As shown in FIG. 2, the second orificed section is adapted to direct the planar flow of gas into substantially tangential contact with the first layers of strand being wound around member 34 along substantially the full length of such layers. As the package grows, the planar flow of gas from the second section will not be oriented tangentially with respect to the outer layers of strand. However, the planar flow of gas will still remain oriented severely oblique thereto. Preferably, such planar flow of gas should be at a volume and velocity sufficient to penetrate and at least partially strip away the boundary layer of air associated with the moving layer of strand during the rotation of member 34 to permit enhanced contact and drying action by the air delivered from the first orificed section. Also, the planar flow of gas from the orifices 52 is directed along a path substantially opposite to the direction of rotation of the layer of strand and thus the boundary layer of air associated with the moving strand to enhance the penetration and stripping action provided by the planar flow of gas.

The planar flow of gas from the second orificed section may be delivered from a plurality of orifices 52 arranged in a row lengthwise of the layer of strand. However, it is to be understood that any suitable orifice configuration, such as a lengthwise oriented slot, can be employed.

A suitable heating means may be positioned upstream of inlet 44 or within housing 42, as desired. Preferably, the air is heated such that the exit temperature of the gas flowing from foraminous surface has a temperature of greater than about 250° F., at least for aqueous based systems. However, it is to be understood that the air may not be heated, or even cooled, if desired.

Preferably, the velocity of the planar flow of gas and the body of gas leaving foraminous surface 48 should have a velocity at least twice the surface velocity of the rotating layer of strand to provide for adequate penetration of the boundary layer of air clinging to the rotating layer of strand.

Figure 3:
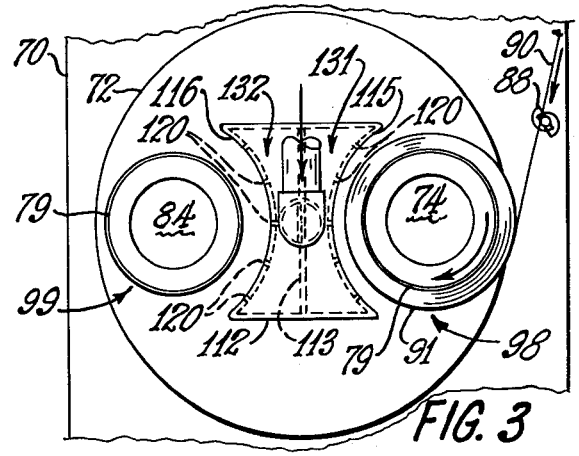
FIG. 3 is a front elevational view of a turret type winder employed in the production of glass filaments having a distribution system according to the principles of this invention.
Figure 4:
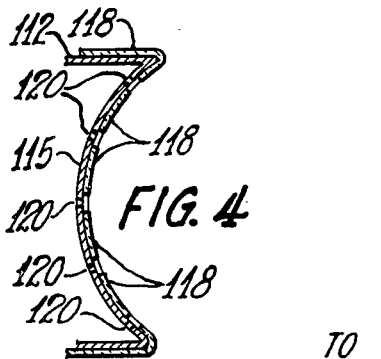
FIG. 4 is an enlarged view of a portion of the distribution system of the type shown in FIG. 3.
Figure 5:
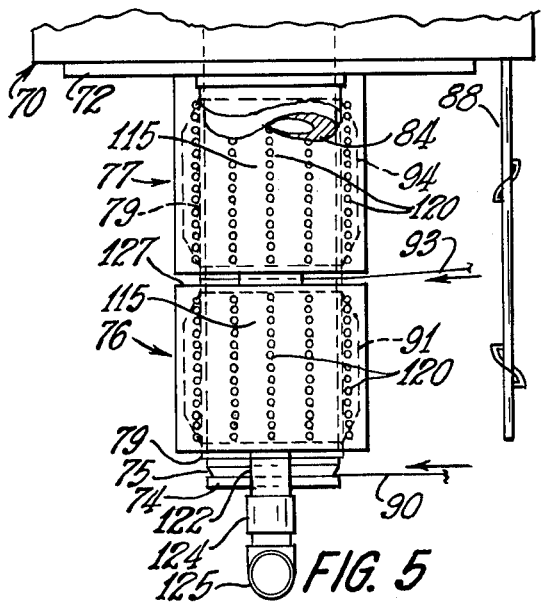
FIG. 5 is a sectioned plan view of the winder shown in FIG. 3 having the indexible head rotated 90 degrees from that shown in FIG. 3.

Referring to FIGS. 3 through 5, turret type winder 70, which functions to draw the streams of molten glass into filaments and wind the gathered filaments into a helically wound package of strand, incorporates a plurality of rotatable collets or members.

As shown in FIG. 3, turret type winder 70 is comprised of an indexible or rotatable turret or head 72 having a first rotatable member or collet 74 suitably journaled therein. Spaced from first member 74, a second rotatable member or collet 84 is also suitably journaled in head 72. As is known in the art, members 74 and 84 are indexible between a package build station 98 and a package doff station 99.

As shown in FIG. 5, first rotatable member 74 includes a temporary collection region 75 at the distal end thereof. Further, member 74 is adapted to receive a pair of sleeves 79 suitably positioned at the first or front package collection region 76 and at the second or rear package collection region 77. Second member 84 is similarly equipped.

For the purposes of clarity, FIG. 5 shows the head 72 rotated halfway or 90° through the index cycle. As shown, winder 70 is adapted to simultaneously wind two strands of glass filaments into two packages. Typically, a suitable traversing mechanism or spiral wire system 88 is adapted to transverse first or front strand 90 back and forth along the length of the first package collection region 76 to deposit strand 90 on sleeve 79 as a helically wound front or first package 91. Similarly, traversing mechanism deposits rear or second strand 93 on sleeve 79 as a helically wound second or rear package 94.

Distribution means 110 is adapted to direct streams of gas, preferably such as heated air, into contact with the layers of strand being deposited upon members 74 and 84 along substantially the entire length of the layers or packages. Preferably, distribution means 110 is adapted to only provide the heated gas to the collet positioned at the package build station during the package build cycle. According to the principles of this invention, the heated air is supplied at a temperature, volume and velocity sufficient to at least partially dry or cure the liquid coating applied to the filaments of strands 90 and 93.

As shown, distribution means 110 is joined to head 72 to be rotatable therewith and is positioned substantially equidistant between members 74 and 84. It is to be understood that other arrangements are possible.

Distribution means 110 is comprised of a housing 112 having first and second foraminous surfaces 115 and 116. Baffle 113 within housing 112 is positioned between first surface 115 and second surface 116 to divide the housing into a first chamber 131 and a second chamber 132.

First surface 115 is associated with first chamber 131 and is adapted to direct a body of high velocity air toward the package collection regions 76 and 77 of first rotatable member 74. Second chamber 132 and second surface 116 are similarly arranged with second member 84.

The foraminous surfaces 115 and 116 may be of any suitable shape but, as shown, have an arcuate configuration generally conforming to the shape of the package. The foraminous surfaces may have any suitable arrangement of supply ports, such as slots or circular holes to deliver the heated air over a substantial portion of the arcuate periphery of the package along substantially the full length of the layers of strand. As shown, the foraminous surfaces 116 and 115 have a plurality of orifices 120 arranged in plurality of rows to deliver the body of heated air as a plurality of planar arrays of streams of gas substantially radially inward toward the axis of rotation of the rotatable member associated therewith. Foraminous surfaces 115 and 116 each extend over a section of the arcuate periphery of the packages greater than or equal to 90°. Preferably, the orificed surfaces 115 and 116 extend along an arc of about 145° to maximize the drying effect and yet permit ready access to the collets and packages by the operator.

The heated air is delivered to a bifurcated inlet section 122 joined to the front face 114 of housing 112. Control means 124 includes a rotatable union adapted to selectively direct the heated gas into either one side or the other of bifurcated inlet 122 to supply only the chamber associated with the collet at the package build station 98. Control means 124 receives a suitable flow of heated air via supply pipe 125 joined thereto which is connected to a heater means 140 which is adapted to heat the air to a predetermined temperature.

Figure 6:
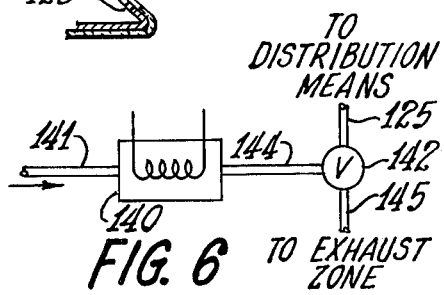
FIG. 6 is a schematic diagram of a portion of the system for supplying heated gas to the distribution means.

As shown in FIG. 6, heater means 140 receives a supply of pressurized air from a suitable source (not shown) via conduit 141. Valve means 142, which is in communication with heater means 140 by means of conduit 144, is adapted to direct the heated air to distribution means 110 when the strands of glass filaments are being wound into a package or packages. At other times, valve 142 directs the heated air into a suitable exhaust zone by means of piping 145 to, among other things, permit the operator to attend to the winder without being bothered by streams of high velocity heated air issuing from the distribution means 110. This permits correction of minor disruptions at the winder in the absence of de-energizing the heating means 140.

Further, to conserve energy and to reduce the surface temperature of distribution means 110 substantially, all of the external surface area of distribution means 110, such as housing 112 foraminous surfaces 115 and 116, front face 114, and the like, have an insulating material 118 suitably joined thereto. For example, a high temperature resistant foam elastomer, such as a foamed silicone rubber, may be fastened to the surfaces by means of a suitable adhesive.

With the automated turret type winder adapted to wind a plurality of packages on each collet shown in FIGS. 3 through 5, housing 112 includes a relieved section or notch 127 adapted to permit rear strand 93 to pass therethrough as required when the turret 72 indexes to transfer the strand winding operation from one collet to the other. Generally, first strand 90 is moved laterally outboard of housing 112 during the indexing cycle; therefore such provisions are not required for strand 90.

As shown, the heated air is supplied to the front of housing 112. However, it is to be understood that the winder and distribution means 110 may be modified to receive the heated air at some other section, such as at the rear portion of housing 112.

During operation, the air should be heated to a temperature greater than about 250° F., and preferably to a temperature of about 350° F. for effective operation. Also, to penetrate the boundary of air adhered to the rotating layers of strand, the velocity of the streams, planar flows or body of air directed towards the layers of strand should have a velocity of at least twice the surface velocity of the layer of strand.

If desired, surfaces 115 and 116 may be designed to deliver a planar flow of air into severly oblique contact with the layers of strand as discussed with respect to FIG. 2.

It is to be understood that the present invention as shown and described herein may be employed in conjunction with various features as set forth in concurrently filed patent application, Ser. No. 450,818, filed on Dec. 20, 1982, in the name of Lawrence Grubka which is hereby incorporated by reference.

It is apparent that within the scope of the present invention, modifications and different arrangements can be made other than as herein disclosed. The present disclosure is merely illustrative, with the invention comprehending all variations thereof.

INDUSTRIAL APPLICABILITY

The invention disclosed herein is readily applicable to the formation and collection of continuous glass filaments.

We claim:

1. Apparatus for forming and collecting continuous glass filaments comprising:
    feeder means for supplying streams of molten glass to be drawn into continuous filaments;
    means for applying a coating to said filaments;
    a rotatable member adapted to wind said filaments therearound and to draw said streams into said filaments; and
    distribution means for directing a moving gas to at least partially dry the coated filaments wound around said member; said distribution means having a foraminous surface adjacent said member, said surface having a first orificed section adapted to direct a body of said gas inwardly toward said strand wound around said member along the length thereof; said surface also having a second orificed section adapted to direct a planar flow of said gas into severely oblique contact with the outer layer of strand wound around said member along the length thereof to penetrate and at least partially strip away the boundary layer of air associated with the layer of strand during rotation of said member.

2. The apparatus of claim 1 wherein said second section has at least one row of spaced apart orifices.

3. The apparatus of claim 1 further comprising means for heating said gas.

4. The apparatus of claim 1 wherein said second section is adapted to direct said planar flow into substantially tangential contrast with the first layers of said strand wound around said member along the length thereof.

5. The apparatus of claim 1 further including a layer of insulating material joined to the foraminous surface.

6. The apparatus of claim 3 further comprising a valve means to stop the supply of heated air to the distribution means at predetermined times.

7. The apparatus of claim 6 wherein said valve means is adapted to direct the heated gas to a preselected zone in the absence of de-energizing said heater means.

8. The apparatus of claim 1 wherein said planar flow of gas from said second orificed section is directed along a path substantially opposite to the direction of rotation of the layers of strand.

9. The method of forming and collecting glass filaments comprising:
    supplying streams of molten glass to be drawn into filaments;
    rotating a member to draw said streams into filaments and to wind said filaments therearound in layers;
    applying a coating to said filaments advancing toward said member;
    directing a planar flow of gas into severly oblique contact with the outer layer of said strand along the length thereof to penetrate and at least partially remove the boundary layer of air associated with the rotating layer; and
    directing a body of gas into contact with the outer strand layer along the length thereof to at least partially dry the coating on said filaments.

10. The method of claim 9 wherein said planar flow and body of gas are directed at said layer at velocity greater than or equal to twice the surface velocity of the outer layer of strand.

11. The method of claim 10 further comprising heating the gas.

12. The method of claim 11 wherein said planar flow of gas and said body of gas have a temperature greater than about 250° F.

13. The method of claim 11 further comprising directing the heated gas away from member at predetermined times.

14. Apparatus for collecting a continuous glass strand as a package comprising
    an indexible head;
    a first member rotatably joined to the head;
    a second member rotatably joined to the head and spaced from said first member; said first and second members being adapted to wind said strand therearound in layers at a package build station; said first and second members being indexible between said package build station and a package doff station; and
    distribution means adapted to direct streams of gas into contact with said layers along the length thereof when said members are positioned at said package build station.

15. The apparatus of claim 14 wherein said distribution means comprises:
    a housing joined to the head and positioned intermediate said members; said housing having a first chamber and a second chamber;

a first foraminous surface joined to said housing associated with said first chamber, said first surface being adapted to direct streams of gas toward said first member;

a second foraminous surface joined to said housing associated with said chamber, said second surface being adapted to direct streams of gas toward said seond member; and control means for supplying said gas to said chamber associated with the rotatable member positioned at the package build station in absence of supplying said gas to said second chamber.

16. The apparatus of claim 15 further comprising means for heating said gas to a predetermined temperature.

17. The apparatus of claim 16 wherein said control means is a rotatable union in communication with a source of said heated gas.

18. The apparatus of claim 17 wherein said rotatable union is joined to an inlet in a front face of said housing.

19. The apparatus of claim 18 wherein said foraminous surfaces are arcuate in shape and extend over an angle greater than or equal to about 90°.

20. The apparatus of claim 15 further comprising: feeder means for supplying streams of molten glass to be drawn into continuous filaments; and means for applying a liquid coating to said filaments between said feeder means and said rotatable members, said streams of gas being effective to at least partially dry or cure said coating.

21. The apparatus of claim 16 further comprising an insulating material positioned over the housing and foraminous surfaces to reduce the surface temperature of said distribution means.

22. The method of claim 9 wherein said body of gas having velocity greater than twice the surface velocity of said layers.

23. The method of claim 22 wherein said body of gas is heated to a temperture greater than about 250° F.

24. The method of claim 23 wherein said body of gas is only directed toward said layers while said member is positioned at a package collection station.

* * * * *